A. T. ELLIOTT.
PROCESS FOR OBTAINING MAGNESIUM CARBONATE.
APPLICATION FILED AUG. 2, 1917.

1,321,424.

Patented Nov. 11, 1919.

INVENTOR.
Alexander T. Elliott
BY Arthur P. Knight
ATTORNEY

UNITED STATES PATENT OFFICE.

ALEXANDER T. ELLIOTT, OF LOS ANGELES, CALIFORNIA, ASSIGNOR OF ONE-HALF TO ALONZO L. STEWART, OF LOS ANGELES, CALIFORNIA.

PROCESS FOR OBTAINING MAGNESIUM CARBONATE.

1,321,424.      Specification of Letters Patent.      Patented Nov. 11, 1919.

Application filed August 2, 1917. Serial No. 184,177.

*To all whom it may concern:*

Be it known that I, ALEXANDER T. ELLIOTT, a citizen of the United States, residing at Los Angeles, in the county of Los Angeles and State of California, have invented a new and useful Process for Obtaining Magnesium Carbonate, of which the following is a specification.

The object of this invention is to remove certain impurities which usually occur in raw magnesite, these impurities decreasing the value of the magnesite as a material for making refractory lining for furnaces. The impurities which are generally present in such quantity as to make their removal desirable are mainly silica and lime, but other impurities, which occur more rarely, may be removed by this method.

In carrying out my invention the crude magnesite is subjected to leaching treatment to dissolve the magnesium constituent, and leave the silica undissolved, the calcium constituent being, if desired, dissolved wholly or partly with the magnesium constituent. The resulting solution is then treated to precipitate and remove any dissolved impurity, for example any calcium compound that may have been dissolved and is then treated to precipitate and recover the magnesium carbonate or other desired magnesium compound. If desired, the process may be so carried out that the calcium compound is left substantially undissolved along with the silica, and in such case it is only necessary to treat the solution for precipitation and recovery of the magnesium.

An important advantage of my process is that it is or may be substantially cyclic, none of the chemicals used entering into the finished product, the reagents being mainly recovered and regenerated and made suitable for treating a fresh charge of crude magnesite, the only loss being the small mechanical loss incidental to the leaching and other operations. Of the several methods that may be used, as hereinafter described, that one will be chosen, in any particular case, for which the required chemicals are most available or are most economical in such case.

Figure 1:
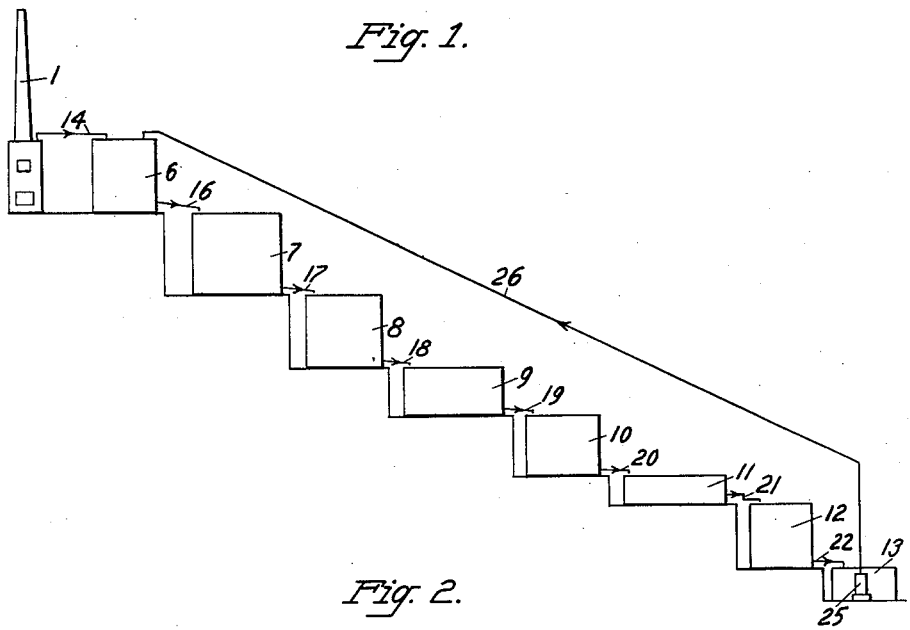
Figure 2:
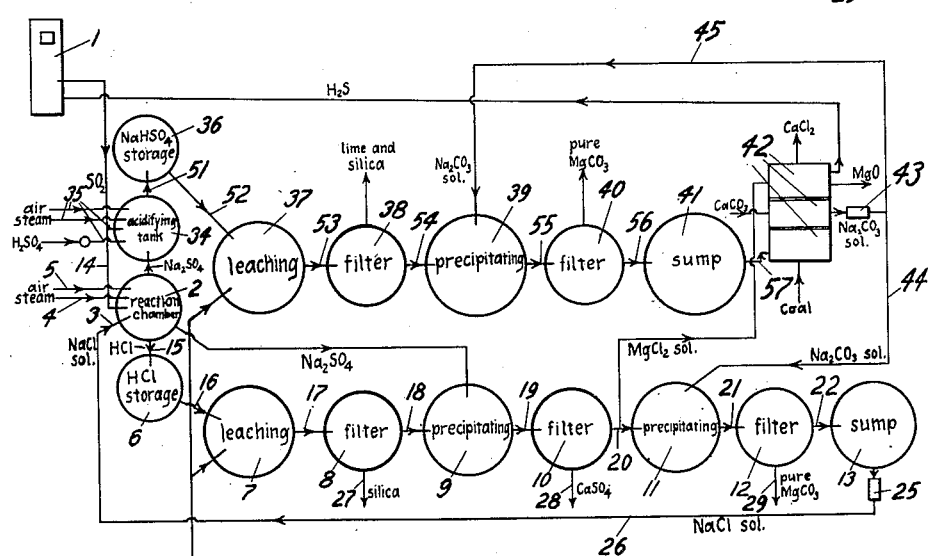

The accompanying drawings illustrate apparatus suitable for carrying out my invention, Figure 1 being a diagrammatic elevation of such apparatus and Fig. 2 a plan or flow sheet thereof.

Said apparatus may comprise suitable means, such as a sulfur burner indicated at 1, for producing one of the required reagents for reacting to form the desired leaching agents; a reaction chamber or tower 2 provided with means 3, 4 and 5, for supplying the necessary reagents to complete the reaction and produce the chief leaching agent; a storage tank 6 for said leaching agent; leaching tank 7; filtering means 8; precipitating tank 9; filtering means 10; precipitating tank 11; filtering means 12; a sump 13; and suitable piping indicated at 14, 15, 16, 17, 18, 19, 20, 21, and 22 for connecting the aforesaid devices in series so that the solution will flow through the same successively; pump and pipe means 25 and 26 for forcing the resultant solution from the sump 13 back to the supply means 3 for tank 2; suitable means 27 and 28 for receiving and conveying away the precipitated material from the filter means 8 and 10 respectively; and suitable means 29 for receiving and conveying away the purified magnesium carbonate from the filter means 12. The several generating, leaching, filtering and precipitating means above referred to may be of any suitable or usual construction, and may be provided in any desired size and number according to the requirements of the case.

The apparatus may further comprise a tank 34 adapted to receive a product of the reaction taking place in chamber 2 and provided with means 35 for supplying the necessary chemicals to react with said product to form an additional or secondary leaching solution; storage tank 36 for said leaching solution; leaching tank 37; filter 38; precipitating tank 39; filter 40; sump 41; suitable means 42 for reacting on the resultant solution of this cycle to convert it to a useful reagent; and pump means 43 for forcing said reagent through pipes 44 and 45 to the precipitating tanks 11 and 39 respectively. Pipe means 50, 51, 52, 53, 54, 55, 56 and 57 may be provided for connecting said devices in series.

In case crude cheap sulfur and crude cheap sodium chlorid are available, the process may be carried out as follows: The sulfur is burned, for example in the burner 1, to form sulfur dioxid gas, which is conducted through pipe 14 to chamber 2, where it reacts with sodium chlorid (supplied for example by supply means 3). In the presence of water (or steam) and air (supplied for example by supply means 4 and 5), the following reaction taking place:

$$SO_2+2NaCl+H_2O+O=Na_2SO_4+2HCl$$

The hydrochloric acid gas produced by this reaction passes off and is collected in any suitable manner, for example in the tank 6 or in a series of such tanks, and used to dissolve the magnesium and calcium compounds as hereinafter described. The sodium sulfate may be in part conducted through pipe 50 to 34 where it may be converted, for example by sulfuric acid or by a further quantity of sulfur dioxid, steam and air supplied through means 35, into acid sodium sulfate, which is conducted to tank 36 and then used for treating a further quantity of magnesite. When using both of these solutions concurrently, the apparatus will be made in two trains of tanks, as indicated in Fig. 2, wherein the several devices for the leaching, filtering, precipitating, etc., for the respective leaching solutions are connected in two separate series.

The primary leaching agent, such as hydrochloric acid, passes through pipe to the leaching tank 7, wherein solution of the magnesium carbonate is effected according to the following reaction:

$$2HCl+MgCO_3=MgCl_2+CO_2+H_2O$$

The solution and undissolved material may be drawn off to filter 8, wherein the undissolved material is removed and the filtrate passes to the precipitating tank 9. When the solution is effected by hydrochloric acid in this manner, the calcium content of the crude material is also dissolved along with the magnesium content, so that the undissolved residue consists substantially of pure silica, which on account of its purity and fine state of division, constitutes, in general, a by-product of considerable value, being for example, well adapted for glass making purposes. This finely divided silica may be carried away from the filter 8 by any usual mechanical means and may be dried and used for any purpose for which substantially pure finely divided silica is suitable. The filtrate from filter 8 contains magnesium chlorid and calcium chlorid, and is treated in tank 9 with sodium sulfate produced in tank 2, the lime being precipitated as calcium sulfate:

$$CaCl_2+Na_2SO_4=CaSO_4+2NaCl$$

The material is then filtered in filter 10 so as to remove the calcium sulfate, the filtrate containing magnesium chlorid being then treated, in tank 11 with sodium carbonate from means 42, precipitating magnesium carbonate as follows:

$$MgCl_2+Na_2CO_3=MgCO_3+2NaCl$$

The solution should be agitated during this precipitation, for example, by means of air, so as to expel the carbon dioxid which may be present from a previous reaction and which retards the formation of the precipitate. The precipitated magnesium carbonate, substantially pure, is removed in filter 12 and is dried, and if desired, calcined, for sale as commercially pure magnesium carbonate or magnesia, as the case may be.

With the reaction above described, sodium and chlorin supplied in the form of sodium chlorid are returned to the cycle in the same form and the sodium chlorid solution from filter 12 may be collected in sump 13 whence it may be pumped back to the tank 2 through pipe 26. The silica and lime are in this case recovered separately and may be sold as by-products helping to pay the cost of operation.

Part of the sodium sulfate produced in the tank 2 may be used in forming acid sodium sulfate, to leach a further quantity of magnesite. For this purpose some of the sodium sulfate solution from tank 2 may be drawn off to acidifying tank or chamber 34 wherein it is treated with sulfuric acid or with sulfur dioxid from burner 1, together with air and steam, to produce acid sodium sulfate. This solution is then applied to another charge of the crude magnesite in tank 37 and the reaction proceeds as follows:

$$NaHSO_4+MgCO_3=MgSO_4+NaHCO_3$$

In this case both the silica and the calcium content of the crude material are left undissolved and are separated in the filter 38. This mixture of calcium compound and silica, both in finely divided condition may also be marketable in some cases as a by-product; for example for building compositions. The filtrate from filter 38 is then treated in tank 39 with sodium carbonate, for example from the means 42 to precipitate magnesium, the solution being heated and agitated to insure such precipitation. The precipitated magnesium carbonate is conducted to filter 40 and removed as above stated. The filtrate from filter 40 which consists substantially of sodium sulfate solution, is collected in the sump 41 and is thence passed to the regenerating means 42 wherein it is treated to produce sodium carbonate, for use in precipitators 11 and 39. For this purpose the sodium sulfate may, after evaporation to dryness, be heated with coal and limestone in similar manner to the latter stage of the Le Blanc process, to produce sodium carbonate and calcium sulfid. The sodium carbonate is extracted and returned to the cycle as above described and the calcium sulfid is heated with a portion of the magnesium chlorid solution from filter 10 to produce calcium chlorid, magnesium oxid and hydrogen sulfid, the reaction being:

$$CaS + MgCl_2 + H_2O = CaCl_2 + MgO + H_2S$$

The magnesium oxid is separated and utilized as a part of the magnesite product. The hydrogen sulfid may be returned to the burner 1 to produce sulfur dioxid.

The impurities, lime and silica, of the crude magnesite are in the case last described recovered together, and may be in some cases used in a state of mixture, or they may be separated by mechanical means, if it is advantageous to do so. It will be noted that the two leaching cycles, using hydrochloric acid and acid sodium sulfate are advantageously operated concurrently, as each furnishes intermediate products which can be used in the other cycle.

What I claim is:

1. The process of obtaining magnesium carbonate from magnesite containing silica, which consists in leaching same with an acid leaching agent to produce a solution containing magnesium compound, separating the solution from the undissolved material, removing impurities from the solution, precipitating magnesium carbonate by the action of a soluble carbonate, separating the precipitated magnesium carbonate from the solution and then regenerating the solution to acid condition for cyclic repetition of the process.

2. The process of obtaining magnesium carbonate from magnesite containing silica and lime compounds, which consists in treating the magnesite with an acid chlorin bearing leach, separating the resulting solution from the undissolved silica, precipitating calcium by addition of a soluble sulfate, separating the precipitate, precipitating magnesium carbonate by addition of a soluble carbonate, separating said magnesium carbonate, and regenerating the solution to acid condition for cyclic repetition of the process.

In testimony whereof I have hereunto set my hand, at Los Angeles, California, this 26th day of July, 1917.

ALEXANDER T. ELLIOTT.